United States Patent

Harzer

[15] 3,681,706

[45] Aug. 1, 1972

[54] VARIABLE-FREQUENCY GENERATOR WITH DIGITAL FREQUENCY SELECTION

[72] Inventor: Peter Harzer, Eningen, Germany

[73] Assignee: Wandel u. Goltermann, Reutlingen, Germany

[22] Filed: Dec. 1, 1970

[21] Appl. No.: 94,114

Related U.S. Application Data

[63] Continuation-in-part of Ser. No. 770,001, Oct. 23, 1968, Pat. No. 3,568,083.

[30] Foreign Application Priority Data

Oct. 24, 1967 Germany............P 15 91 819.1
Dec. 6, 1969 Germany............P 19 61 329.7

[52] U.S. Cl..........................331/1 A, 331/4, 331/14, 331/17, 331/25, 331/178

[51] Int. Cl...........................H03b 3/04, H03b 23/00

[58] Field of Search..........331/1 A, 4, 14, 17, 18, 25, 331/178

[56] References Cited

UNITED STATES PATENTS 3,395,361 7/1968 Brauer............................331/14
3,514,713 5/1970 Leyde.............................331/14
3,555,446 1/1971 Braymer.....................331/14 X

*Primary Examiner*—Roy Lake
*Assistant Examiner*—Siegfried H. Grimm
*Attorney*—Karl F. Ross

[57] ABSTRACT

The operating frequency of an electronically adjustable oscillator is continuously determined by a digital counter establishing a variable measuring interval during which the number of oscillator cycles reaches a magnitude preset in a digital selector. A feedback circuit from the output of a comparator, receiving the values stored in the counter and in the selector, readjusts the oscillator to make the measuring interval equal to a predetermined base period (e.g., of 1 second), consistent with the selected frequency, starting concurrently with that base period. A timing circuit periodically emits a pair of reference pulses marking the beginning and the end of the base period, at least the second pulse being subject to shifting under the control of a synchronization monitor to compensate for any time lag between the beginning of the base period and the start of the first full oscillator cycle; a further shifting of the second reference pulse, under the control of an ancillary selector, enables the generation of frequencies whose chosen magnitudes lie between adjacent settings of the digital selector. A pair of such digital selectors, alternately connectable to one of the comparator inputs, may serve for the establishment of upper and lower limits of a sweep range for the oscillator frequency; a third selector, effective during the sweep, may generate a frequency marker whenever the value registered therein matches the momentary output frequency of the oscillator.

28 Claims, 8 Drawing Figures

Peter Harzer
INVENTOR.

BY

Karl F. Ross
Attorney

Peter Harzer
INVENTOR.

BY
Karl F. Ross
Attorney

Peter Harzer
INVENTOR.

BY

Karl F. Ross
Attorney

Inventor: Peter Harzer
Karl F. Ross Attorney

Peter Harzer
INVENTOR.

BY

Karl F. Ross
Attorney

VARIABLE-FREQUENCY GENERATOR WITH DIGITAL FREQUENCY SELECTION

This application is a continuation-in-part of my copending application Ser. No. 770,001 filed Oct. 23, 1968, now U.S. Pat. No. 3,568,083.

In my above-identified prior application and patent I have disclosed a variable-frequency generator controlled by a digital selector whose setting is compared with that of a digital counter, the latter being continuously stepped by successive than pulses from the oscillator so as to count the number of cycles occurring in a measuring interval which starts concurrently with a predetermined gating interval or base period established by a timer. Whenever the count matches the setting of the selector, an identity signal is generated which coincides with the end of the base period only if the operating frequency of the oscillator agrees with the value registered in the selector. If the identity signal leads or lags with reference to a terminal pulse from the timer, marking the end of the base period whose duration is somewhat less Than the operating cycle or recurrence period of the timer, a test circuit responds to feed back a discriminating signal of one or the other polarity to the frequency-controlling element of the oscillator in order to bring about the desired operating frequency. Thus, the polarity of the discriminating signal (and therefore the sign of the resulting frequency increment) depends on the relative order of occurrence of the terminal pulse and the identity signal.

The same basic system, as likewise disclosed in my prior application, may be used to control a frequency sweep within the desired range by alternately connecting two digital selectors to a coincidence gate matching their setting with the oscillator frequency as registered by the counter, these selectors respectively determining the lower and the upper limit of the sweep range.

The counting pulses obtained from the oscillator output must have a cadence identical with the oscillator frequency and must therefore each be generated at a predetermined point of a respective cycle; this can be realized easily enough by differentiation of a square wave derived from the generated oscillation. Since, however, the oscillator frequency is independent of the recurrence period of the timer, the first counting pulse within any base period may have any time position up to $2\pi$ (in terms of the oscillator frequency) with reference to a starting pulse from the timer. This variable phasing of the counting pulses within the gating interval results in abrupt frequency jumps inasmuch as a slight relative shift can alter the number of pulses counted within the base period even if the pulse cadence remains the same.

It is, therefore, an object of my present invention to provide an improved frequency-control system of the general type described which eliminates this so-called digital error so as to allow a more exact oscillator adjustment.

A related object is to provide means in such a system for enabling the selection of fractional frequency increments lying between the numerical values to which the digital selector can be set.

In a system including two digital selectors for establishing the lower and upper limits of a sweep range, additional problems occur if the range limits are to be independently selectable and if, upon a resetting of either of these limits, the readjustment of the frequency control at the corresponding end of the sweep must be carried out in a relatively short time. Another important object of the present invention, therefore, is to provide improved means for expeditiously generating such a sweep in a system of the aforedescribed character.

It is also an object of my invention to provide means in such a frequency-sweep generator for selecting a particular frequency within the sweep range and creating a marker signal whenever the sweep passes through that particular frequency.

According to a feature of my present invention, applicable to both a single-frequency generator and a so-called "wobbled" or periodically frequency-modulated oscillator, I provide a monitoring circuit connected to both the timer output and the input of the digital counter for detecting the aforedescribed time lag, if any, between the moment of inception of a base period and the counting pulse appearing at the beginning of the first full oscillator cycle of that period, the monitoring circuit controlling a delay network which retards the effectiveness of the following terminal pulse by a length of time equaling this time lag. Such retardation may take place either within the timer itself, as by interposition of the delay network between two stages of a chain of binary frequency dividers to retard the transmission of a stepping pulse therebetween, or between the timer output and the associated input of the test circuit generating the discriminating signal. In the latter instance the delay network may include a monostable element (or monoflop) having a relaxation period which is variable by the corrective output voltage of the monitoring circuit. The length of this relaxation period is added onto the normal gating interval, measured by the timer, by transmitting an output pulse of the timer directly to the test circuit via a shunt path merging with the monoflop output in an OR gate.

With the digital error thus eliminated, an additional shift of the terminal pulse to vary the effective length of the base period can be used for adjusting the oscillator frequency to a value between those corresponding to two consecutive settings of the digital selector. As it is easier to lengthen the base period than to shorten it, I prefer to utilize for this purpose an additional retarding network which may be cascaded with the aforementioned delay network and which, like the former, may include a by-passed monoflop. Since any chosen delay time for this additional retarding network will encompass a number of oscillator cycles depending upon the operating frequency, this delay time must be a function not only of the desired fractional frequency increment but also of the actual operating frequency. Thus, an ancillary selector (e.g., a potentiometer) may serve to vary one operating parameter of the retarding network, the effect of this variation being weighted by the modification of another operating parameter in accordance with the selector setting. The weighting factor may be controlled by the digital selector either directly or through the intermediary of the frequency-determining circuit of the oscillator which stores a charge related to the selector setting. The ancillary selector may be calibrated in terms of specific (e.g., decadic) fractions of a unit increment or may be continuously variable to provide a choice of $n$ different frequencies per unit step where $n = t_o\Delta f$, $t_o$ being the length of the period in seconds whereas $\Delta f$ is the incremental frequency difference corresponding to a unit step of the digital selector. Thus, with $t_o = 1$ sec and $\Delta f = 100$ Hz, $n = 100$; with a base period of one second, therefore, all the integral frequency values within the selector range will be available regardless of the value of $\Delta f$.

If it is desired to wobble the operating frequency of the oscillator within a sub-band corresponding to the range of adjustment realizable by means of the aforedescribed retardation network, the initial setting of the digital counter may be modified by introducing a preliminary negative count, substantially compensating the frequency increment introduced by this network at the midpoint of its effective range, so that a departure from that midpoint in one direction or the other will result in either an increase or a decrease of the operating frequency; this enables a progressive variation of the frequency within that sub-band, e.g., according to a monotonous (sawtooth) pattern, for exploring a region centered on a mean frequency chosen with the aid of the digital selector. It should be noted that the sub-band covered by such a sweep need not be coextensive with the aforementioned incremental frequency difference $\Delta f$ but could be a multiple or a fraction thereof.

The several adjustments for the elimination of the digital error and for the superposition of a nondigital frequency increment, if desired, may be employed in fixing the lower and upper limits of a broad sweep range (substantially exceeding a unit increment) with the aid of two independently settable digital selectors. In a system of the latter type, according to another aspect of my invention, the frequency-determining circuit of the oscillator is alternately subjected to charging currents from two sources designed to establish different magnitudes of a control variable (e.g., the charge of a condenser) stored in that circuit. These current sources may be amplifiers responsive to voltages registered on respective capacitors similar to the storage condenser of the frequency-determining circuit of the oscillator, provided that the charge on these capacitors remains substantially constant during a switchover period in the course of which the oscillator frequency gradually changes from one limit of its sweep range to the other. At the end of each switchover period, i.e., of the rising or falling sweep stroke, a readjustment interval established by the timer makes the test circuit effective to modify the controlling capacitor charge for the purpose of correcting any deviation of the oscillator frequency from the corresponding range limit specified by the associated selector; advantageously, this modification takes place concurrently in the storage condenser of the frequency-determining circuit and in the registering capacitor associated with the respective source of charging current.

If the sweep is to be visualized on an oscilloscope, it will be desirable to minimize the duration of the substantially horizontal stretches which represent the readjustment intervals separating the rising and falling flanks. Thus, the shortest possible time should be allotted to the periodic restoration of the charges of the limit-setting capacitors to their proper level as determined by the associated selectors. These short readjustment intervals, however, may be insufficient to allow for a major charge modification upon a resetting of the range limits; another feature of my invention, therefore, provides for an extension of the readjustment interval by the timer in response to an alarm signal from a threshold device which emits such a signal whenever the disparity between the actual operating frequency and the selected range limit (as translated into a discriminating signal from the test circuit) surpasses a predetermined level. The alarm signal may also actuate a visual or audible indicator to alert the operator to the fact that the system is in a process of major readjustment.

A further feature of my invention involves the generation of frequency markers whenever the sweep passes through a value preset on an ancillary digital selector. This value may be stored, again in the form of a condenser charge, in an additional register connected to one input of a comparator whose other input is connected to the continuously recharging storage condenser of the frequency-determining circuit. Whenever the two charges are equal, the comparator emits a marker pulse which temporarily arrests the sweep and establishes a brief readjustment period for modifying the condenser charge of the ancillary register in accordance with the actual setting of the corresponding selector, essentially in the manner described above with reference to the two limit registers. If, however, the electrical variable (i.e., the condenser charge) stored in the ancillary register is of such magnitude that the corresponding oscillator frequency lies outside the currently selected sweep range, no match will occur during the sweep and no charge modification under the control of the selector will take place. In such an event, according to a more specific feature of my invention, a detector responsive to the comparator output establishes an equalizing circuit between the storage capacitors of the ancillary register and that of the frequency-determining circuit to let the former acquire the charge of the latter. In this way, the charge of the ancillary register is rapidly brought into the sweep range so that the system may thereafter function in the aforedescribed manner by generating at least one marker pulse per sweep and assimilating the capacitor charge of the marker register to the setting of the ancillary selector during the brief sweep-interruption period initiated by each marker pulse.

The marker pulse may also be generated, in a system embodying my invention, by connecting the ancillary selector to the coincidence gate throughout each switchover period (i.e., during the entire ascending and descending flanks of the sweep) and continuously monitoring the output of the test circuit during that period with the aid of a sensing device, such as a flip-flop, which responds to a change in the polarity of the discriminating signal from that test circuit occurring at the instant when the selector setting matches the operating frequency of the oscillator.

The timer referred to above may include two separate components, i.e., a generator of periodically recurring reference pulses establishing the aforedescribed base periods (or gating intervals) and a sweep circuit determining the switchover periods and readjustment intervals. The switchover periods may encompass a multiplicity of timer cycles or recurrence periods during which the test circuit operates ineffectually (except for the possible generation of a marker pulse or a reloading of an ancillary marker register as discussed above); the intervening readjustment intervals, however, should generally be less than two full recurrence periods, except when these intervals are extended to allow for a major change in the contents of either or both limit registers.

The sweep circuit advantageously responds to the reference pulses and to the alarm signal, if any, from the threshold device to terminate each readjustment interval, whether extended or not, at the end of a respective recurrence period so that each sweep will have the same time position relative to the recurrent reference pulses.

The above and other features of my invention will be described in detail hereinafter with reference to the accompanying drawing in which.

Figure 1:
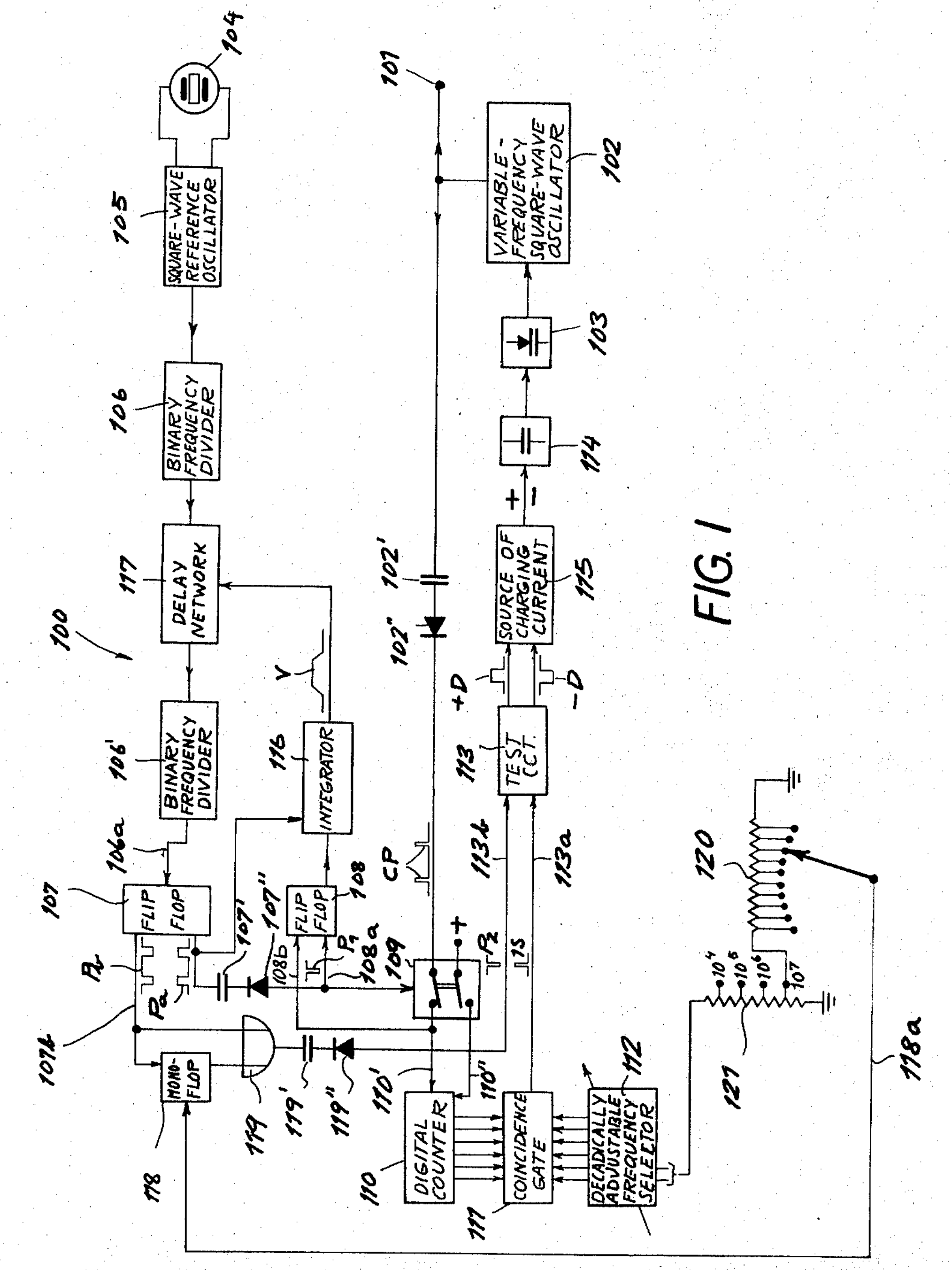
FIG. 1 is a block diagram of a variable-frequency generator embodying my invention.

FIG. 1 shows a variable-frequency oscillator 102, specifically a square-wave generator (or sine-wave generator followed by a squarer), with an output terminal 101 connected to a load not further illustrated, e.g., and oscilloscope. The operating frequency of oscillator 102 is controlled by a frequency-determining circuit 103 diagrammatically illustrated as including a varactor. The biasing voltage for this varactor is supplied by a condenser 114, e.g., by way of an amplifier not shown; thus, the oscillator frequency depends on the magnitude of the condenser charge as is well know per se. Condenser 114 is chargeable by a current source 115 whose output has a magnitude and sign determined by a discriminating signal from an associated test circuit 113. The latter has two input leads **113*a*, 113*b*** and, like similar circuits disclosed in my prior application, Ser. No. 770,001, responds to the relative order of occurrence of a pair of consecutive pulses on its two inputs to generate either a positive or a negative output voltage.

A timing circuit 100 comprises a reference oscillator 105 whose frequency is stabilized by a quartz crystal 104 in its tank circuit. Oscillator 105 also generates a square wave which is fed to a binary frequency divider with two cascaded stages (or groups of stages) 106, 106′ separated by a delay network 117. The output lead **106*a* of the final divider stage trips a flip-flop 107 which is thus alternately set and reset, though not necessarily for like periods; by way of example, it will be assumed — as illustrated in graphs (a) and (b) of FIG. 1A—that the set output lead 107*a* of this flip-flop carries positive pulses $P_a$ substantially shorter than corresponding pulses $p_b$ on its reset output lead 107*b*, this being easily accomplished by a superposition of the outputs of two or more final divider stages to drive the flip-flop 107**.

Figure 1A:
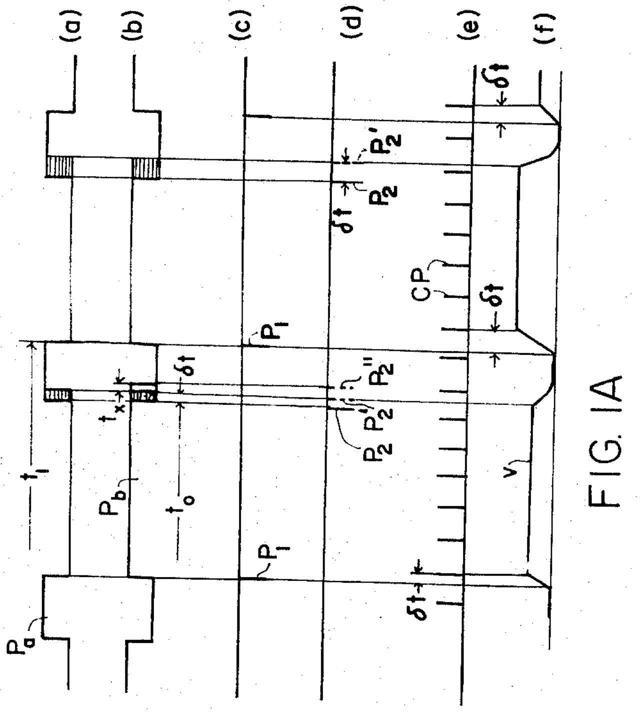
FIG 1A is a set of explanatory graphs relating to the operation of the system of FIG. 1.

The rectangular pulse $P_a$ periodically appearing on lead **107*a* is differentiated, as shown in graph (c) of FIGS. 1A, in a circuit diagrammatically represented by a condenser 107′ and a diode 107″. The resulting negative spike $P_1$ periodically reverses an electronic switch or gate 109 interposed between the output 101 of oscillator 102 and the input 110′ of a digital counter 110**. The interval defined by successive spikes $P_1$ constitutes a recurrence period $t_1$ of constant duration.

The reset output lead **107*b*, carrying pulses $P_b$, is connected through an OR gate 119 and a differentiation circuit 119′, 119″ to the second input lead 113*b* of test circuit 113. A branch of lead 107*b* feeds a monoflop 118 whose off-normal output merges in OR gate 119** with the pulse $P_b$; the trailing edge of the combined pulse issuing from this OR gate represents a terminal pulse $P_2$, graph (d) of FIG. 1A, marking the end of a base period $t_o$ initiated by the preceding starting pulse $P_1$.

A differentiation circuit 102′, 102″ in the output lead of the oscillator derives from the square wave Thereof a single pulse CP, graph (e) of FIG. 1A, occurring at the beginning of each cycle to step the counter 110 if the switch 109 is in its normal position; upon its brief reversal, this switch energizes a zero-setting lead 110″ of the counter whereby the count is restarted at the beginning of each base period $t_o$ and recurrence period $t_1$.

The output pulse $P_1$ on lead **107*a* also reaches a setting input 108*a* of a flip-flop 108 whose resetting input 108*b* is tied to the counter input 110′; thus, flip-flop 108 is set upon the restarting of the count and is reset by the first oscillator pulse CP fed thereafter to counter 110. On being thus set, and as illustrated in the graph (f) of FIG. 1A, flip-flop 108 energizes an integrator 116 to generate a voltage $v$ which rises linearly with time and whose peak is therefore proportional to the period $\delta t$ elapsed between the occurrence of starting pulse $P_1$ and the generation of the first counting pulse CP within the ensuring period $t_o$. Voltage $v$ determines the amount of retardation introduced by the delay network 117 in the transmission of a stepping pulse from divider section 106 to divider section 106′, the resulting delay shifting the terminal pulse $P_2$ by exactly the time lag $\delta t$ to a new position $P_2'$ so as to lengthen the base period $t_o$. If monoflop 118 is inoperative or omitted, lead 113*b* of test circuit 113 is energized in this latter time position to generate the discriminating signal controlling the charging circuit 115**.

A manually settable, advantageously decadically calibrated digital selector 112 has a multiplicity of binary stages duplicating those of counter 110, the selector and the counter working into a coincidence gate 111 which feeds the input lead **113*a* of test circuit 113. Whenever the numerical value registered by counter 110 matches the setting of selector 112, gate 111 emits an identity signal IS which, unless it coincides exactly with a pulse $P_2$ on lead 113*b*, trips the test circuit 113** to generate a discriminating signal D of one or the other polarity depending on the order of occurrence of IS and $P_2$. As will be apparent from FIG. 1A, the number of pulses CP counted during the extended base period (terminating in position $P_2'$) is always one more than the number of oscillator cycles; this error may be readily compensated, if necessary, by resetting the counter to −1 rather than to 0.

The duration of the unstable state of monoflop 118 may be varied, under the control of a potentiometer 120, between 0 and a time equaling a number of cycles of oscillator 102 (at the lowest operating frequency) corresponding to the minimum frequency increment realizable with the aid of selector 112, i.e., to the frequency difference $\Delta f$ represented by a unit step of that selector. If the selector has, for example, six decades ranging from $10^2$ to $10^7$ Hz, a unit step corresponds to 100 Hz representing a count of 100 pulses CP if $t_o = 1$ sec. By extending the base period $t_o$ with the aid of monoflop 118, intervening frequencies separated by steps of, say, 10 Hz may also be selected. For this purpose the potentiometer 120 is provided with 10 bank contacts to impress the proper biasing potential upon a control lead 118*a* of monoflop 118. As already explained, however, this potential must be weighted by a factor inversely proportional to the actual operating frequency of the oscillator as determined by the digital selector 112. To this end, potentiometer 120 is connected in cascade with a voltage divider 121 receiving a corrective voltage from selector 112.

In practice, only a small number of decades (e.g., the two most significant ones, as shown) of the selector setting will be needed to convert the absolute bias from potentiometer 120 into a relative bias commensurate with the length of an oscillator cycle. With lower operating frequencies, for which the highest decade or decades of the selector are not used, the input to voltage divider 121 will have to be correspondingly relocated with simultaneous reduction in its step-down ratio by a corresponding power of 10.

With lead 118*a* energized by a biasing voltage from potentiometer 120, the appearance of a pulse $P_b$ on lead 107*b* trips that monoflop so that OR gate 119 is simultaneously energized by pulse $P_b$ and by the off-normal monoflop output which persists for the duration of pulse $P_b$ and for a supplemental relaxation period $t_x$, graph (b) of FIG. 1A, depending on the magnitude of this baising voltage. If the biasing voltage is 0, monoflop 118 is blocked so that only the directly transmitted pulse $P_b$ passes the OR gate 119 and supplies the terminal pulse $P_2$ or its shifted replica $P_2'$, depending upon the absence or presence of a time lag $\delta t$. Delay circuit 117 may comprise a bypassed monoflop with OR gate similar to the network 118, 119. For the construction of the monoflop itself, reference may be made to FIG. 4 described hereinafter.

Figure 2:
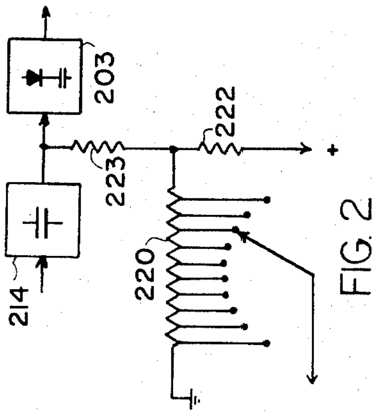
FIG. 2 is a fragmentary diagram showing a partial modification of the system of FIG. 1.

In FIG. 2, in which only the storage condenser 214 and the varactor 203 of a system similar to that of FIG. 1 have been shown, a potentiometer 220 (analogous to potentiometer 120 of FIG. 1) is connected across the condenser 214 in cascade with a fixed voltage divider 222, 223. The oscillator frequency varies directly with the condenser potential, i.e., with the biasing voltage applied to varactor 203, so that higher frequencies generate a higher control voltage for monoflop 118 (FIG. 1) corresponding to a proportionally reduced relaxation period $t_x$, as explained hereinafter with reference to FIG. 4.

Figure 3:
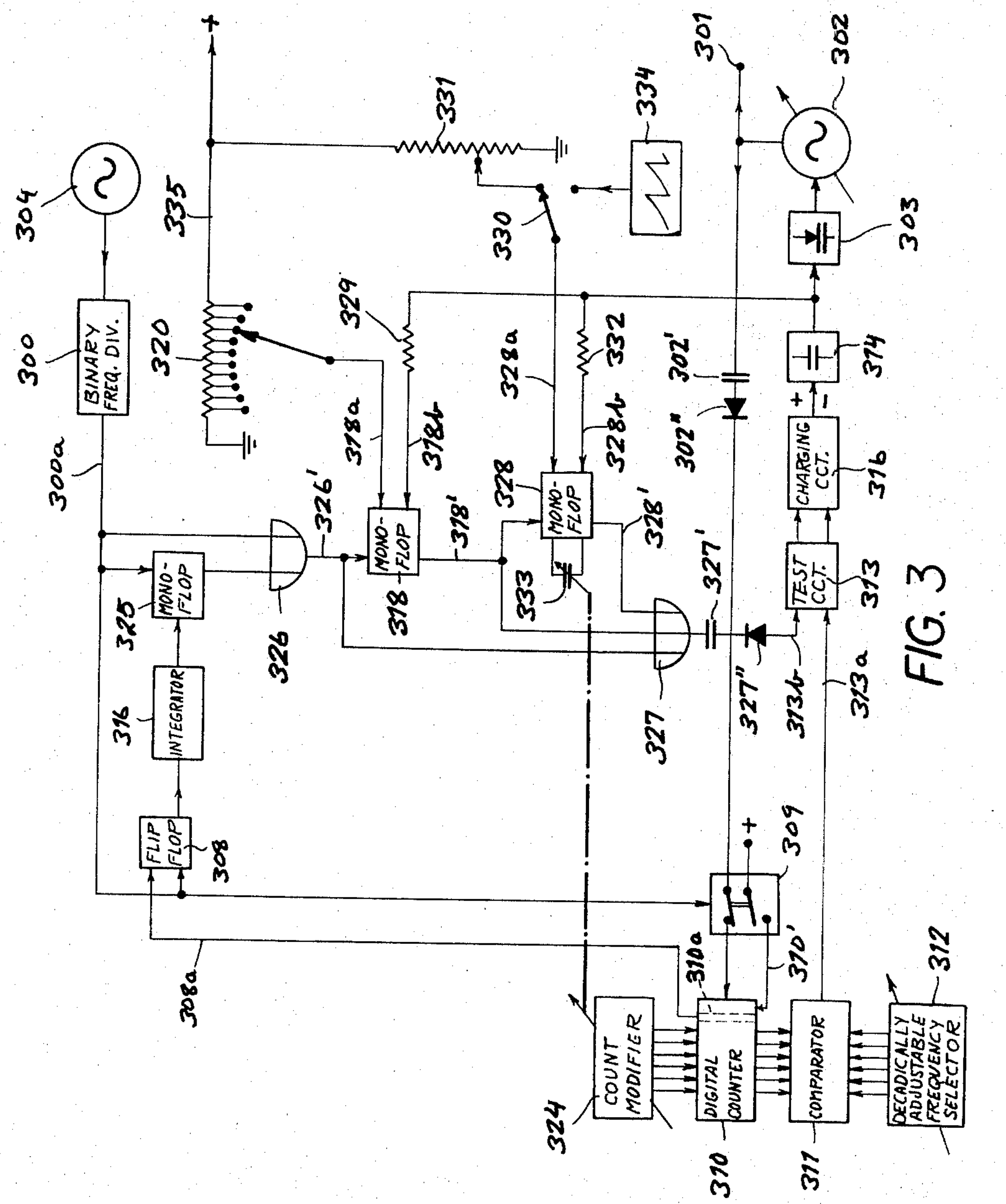
FIG. 3 is another block diagram illustrating a further embodiment.

In FIG. 3, where elements corresponding to those of FIG. 1 have been designated by analogous reference numerals distinguished only by a "3"0 in the position of the hundreds digit, the delay network 117 of the first embodiment has been replaced by a monoflop 325 periodically tripped by a pulse on output lead 300*a* of frequency divider 300, its off-normal output merging with that pulse in an OR gate 326 substantially as described with reference to elements 118 and 119 of FIG. 1. Another monoflop 318, with a control input 318*a* biased by a potentiometer 320 and with another such input 318*b* connected in series with a resistor 329 to the live terminal of storage condenser 314, is connected in cascade with monoflop 325 (via OR gate 326) and with a further monoflop 328. The latter monoflop has a first control lead 328*a*, shown connected by way of a manual switch 320 to the slider of a potentiometer 331, another control lead 328*b*, connected in series with a resistor 332 to the live terminal of condenser 314 in parallel with lead 318*b*, and a variable capacitor 333 included in the time-constant circuit which determines the relaxation period of that monoflop. Capacitor 333 is mechanically linked with a manually presettable selector 324 working into counter 310 to modify the operation thereof, i.e., to introduce a predetermined negative count into same so as to lengthen the time required for the counter (with a given oscillator frequency) to reach the value registered in selector 312. Capacitor 333 and its associated impedances are so dimensioned that, with potentiometer 331 in its midposition, the relaxation time of monoflop 328 equals the lengthened interval measured by counter 310 so that the gating interval is correspondingly lengthened whereby the identity signal IS (FIG. 1) exactly coincides with terminal pulse $P_2$ if the oscillator 302 has the frequency preset by means of selector 312. This is possible since the biasing voltage applied to the monoflop over its lead 328*b* is a function of the charge of condenser 314 and therefore of the operating frequency of the oscillator.

Potentiometers 320 and 331 are directly connected between ground and a positive bus bar 335. A manual displacement of the slider of potentiometer 320 varies the relaxation period of monoflop 318 which is translated into a proportional variation of the relaxation period of monoflop 328 weighted by a frequency-dependent factor represented by the biasing potential on lead 328*b*. Thus, potentiometer 320 serves—like its counterparts 120 and 220—to increase the digitally preset frequency by a decimal fraction of a unit increment $\Delta f$, e.g., in steps of 10Hz. Potentiometer 331 may be displaced to either side of its midpoint to lower or to raise the selected operating frequency in a quasi-continuous manner, i.e., in smaller steps determined by the limit of resolution of the system (e.g., in steps of 1Hz if $t_o = 1$ sec, as explained above). With switch 330 in its alternate position, a sawtooth-voltage generator 334 continuously modulates the operating frequency to scan a relatively narrow band centered on a frequency chosen with the aid of selectors 312 and 320. The width of this band, owing to the bias supplied via lead 328*b*, is also absolute in terms of cycles per second and independent of the operating frequency of oscillator 302. Such frequency modulation may be used to ascertain the transmission characteristics of a test object within the selected band.

Output leads 326′, 318′ and 328′ of OR gate 326, monoflop 318 and monoflop 328 have branches which are combined in an OR gate 327 feeding the input 313*b* of test circuit 313 by way of a differentiation circuit 327′, 327″, for the purpose and in the manner described with reference to OR gate 119 of FIG. 1.

FIG. 3 also illustrates a modification (equally applicable to the system of FIG. 1) of the manner in which the flip-flop 308 is reset by the first counting pulse CP passing the gate 309. The input lead 308*a* of this flip-flop is connected to an ancillary binary input stage 310*a* of counter 310 so as to be energized only upon a reversal of the state of that stage by the first counting pulse. For the reasons explained above, the switching of this initial stage establishes a count 0 rather than +1 if the modifier 324 is not set; thus, the negative count introduced by this modifier is increased by 1 (e.g., from a nominal value of −1,000Hz to an actual value of −1,001Hz) to insure correct operation.

Figure 4:
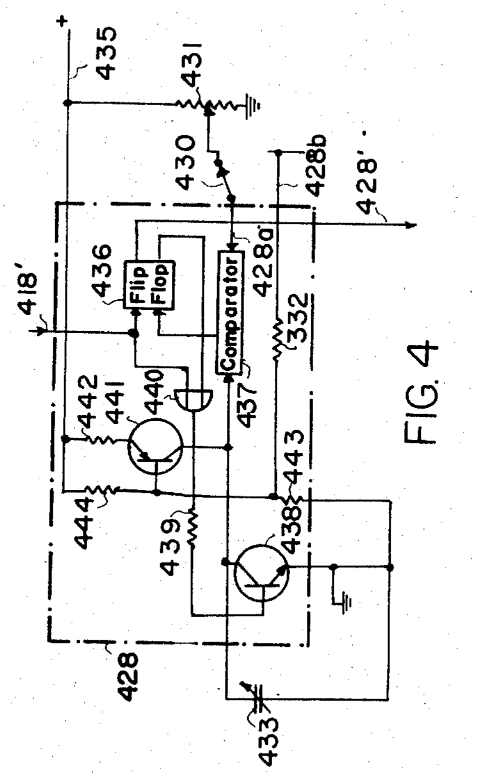
FIG. 4 is a circuit diagram showing details of one of the components of the system of FIG. 3.

In FIG. 4 we have illustrated at 428 a possible circuit arrangement for the monoflop 328 of FIG. 3; elements 430–433 represent the elements 330–333 of the preceding Figure. The circuit includes a flip-flop 436 with a setting input lead 418′ (corresponding to lead 318′ of FIG. 3); the set output of this flip-flop appears on a lead 418′ (318′ in FIG 3). Flip-flop 436 is resettable by the output of a comparator 437 having one input connected to the ungrounded terminal of condenser 433 and having its other input tied to switch 430 by way of lead 428*a*. The first input of the comparator is also connected to the collector of an NPN transistor 438 whose emitter is grounded and whose base is tied to the reset output of flip-flop 436 via a resistor 439 and an OR gate 440. The second input of OR gate 440 is connected to input lead 418′. A PNP transistor 441 has its collector joined to that of transistor 438 and has its emitter connected to positive potential on bus bar 435 through a resistor 442; the base of transistor 441 is tied to biasing lead 428*b* which terminates at the junction of two resistors 443, 444 forming a voltage divider between bus bar 435 and ground.

With lead 418′ de-energized and with flip-flop 436 in its reset state, transistor 438 is saturated so that condenser 433 is substantially discharged. When a positive pulse appears on lead 418′, flip-flop 436 is switched but transistor 438 remains clamped in its saturated condition for the duration of that pulse, owing to the connection of its base to lead 418′ through OR gate 440. Upon the cessation of the pulse, transistor 438 cuts off and condenser 433 begins to charge at a rate determined by its own capacitance (as adjusted through its mechanical coupling with count modifier 324, FIG. 3) any by the conductivity of transistor 441 serving as a variable charging resistance. This conductivity, in turn, depends on the bias on conductor 428*b* which in turn is proportional to the operating frequency of the controlled oscillator. Thus, higher operating frequencies reduce the internal resistance of transistor 441 and shorten the time required by condenser 433 to charge up to the potential of lead 428*a*, i.e., to trip the comparator 437 for resetting the flip-flop 436 and discharging the condenser 433.

If lead 428*a* is grounded, i.e., if potentiometer 431 is adjusted to the value 0, comparator 437 is initially operative to keep the flip-flop 436 from switching. Conductor 439′ then remains de-energized, yet the pulse on lead 418′ is transmitted without lengthening via a bypass path terminating at the downstream OR gate (327 in FIG. 3).

It will be evident that a circuit arrangement such as that shown in FIG. 4 can also be used for the other adjustable monoflops illustrated in the preceding Figures, with replacement of the variable capacitor 433 by a fixed condenser and, in the case of monoflop 118 or 325, with omission of the second biasing lead 428*b*; in the latter instance, of course, a fixed resistor may be substituted for transistor 441.

Figure 5:
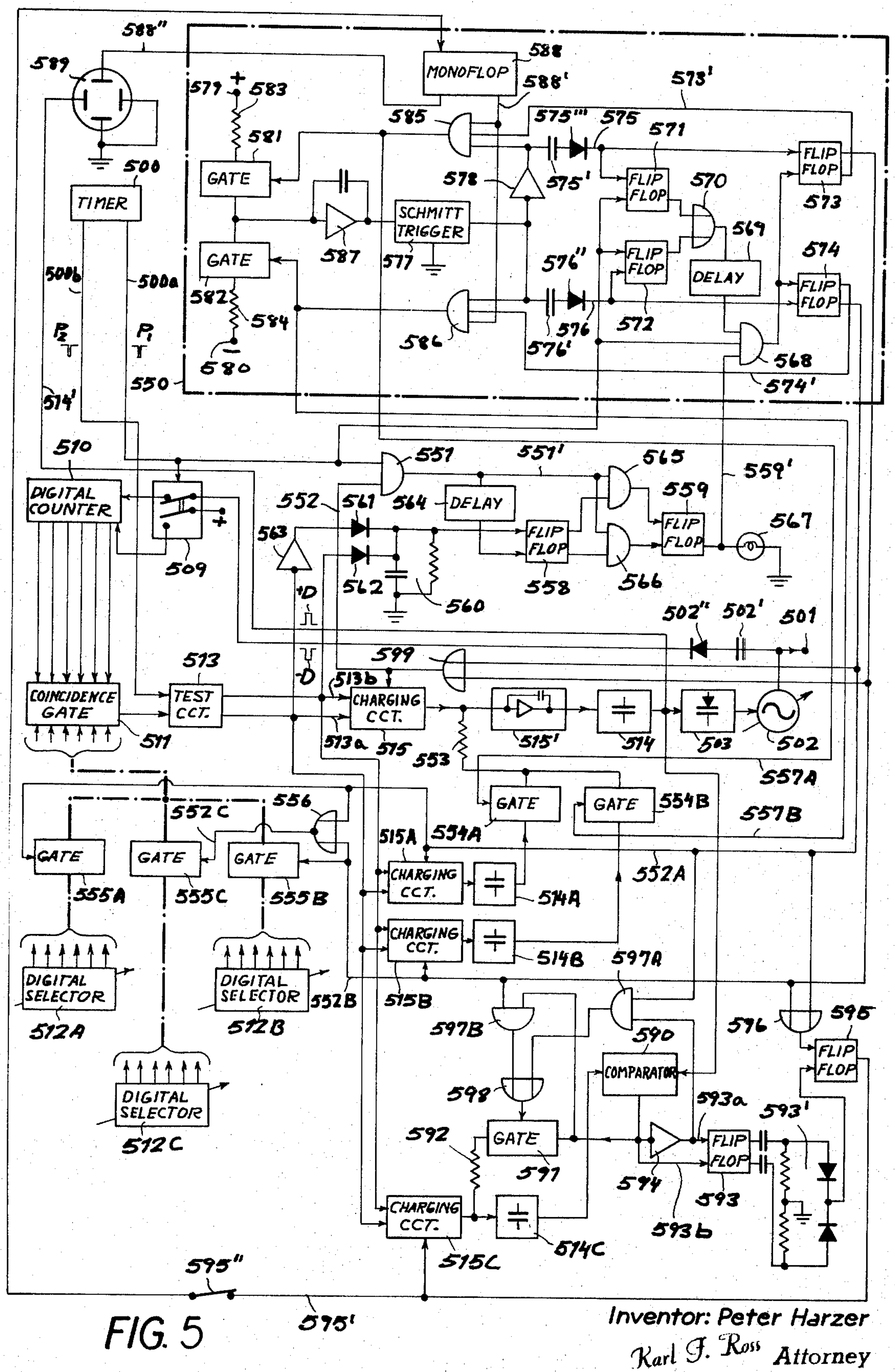
FIG. 5 is a further block diagram representing yet another embodiment.

In FIG. 5, where reference numerals designating elements previously described again differ only in their hundreds digit from those employed in preceding Figures, I have shown a system in which the controlled oscillator 502 is frequency-modulated to scan a band between two limiting frequencies registered by means of two independently settable digital selectors 512A and 512B, e.g., for the purpose of determining the impedance characteristics of a test object as noted above. A timer 500 with output leads 500*a*, 500*b* generates the aforedescribed reference pulses $P_1$, $P_2$ fed to gate 509 and test circuit 513, respectively, pulse $P_1$ being also applied to a sweep circuit 550 and to one input of an AND gate 551 whose other input is tied to a lead 552. For the sake of simplicity, FIG. 5 does not show any means for eliminating the digital error and for selecting a fractional frequency increment as discussed in conjunction with the preceding embodiments, it being understood that these refinements are also useful in the system now being described.

Lead 552 extends to a blocking input of charging circuit 515 which, as before, drives the storage condenser 514 to determine the operating frequency of oscillator 502. A final stage of this charging circuit has been shown separately as an integrating amplifier 515′. The junction of circuit 515 and amplifier 515′ is connected via a resistor 553 and two normally closed gates 554A, 554B, in parallel, to the outputs of respective limit registers 514A and 514B shown to comprise charge-storing condensers similar to that of unit 514 in the frequency-determining circuit of oscillator 502. Registers 514A and 514B are served by respective charging circuits 515A, 515B, generally similar to circuit 515 and corresponding circuits of prior embodiments, whose inputs are connected in parallel with those of circuit 515 across the output leads 513*a* and 513*b* of test circuit 513. A fourth charging circuit 515C also receives the discriminating signal D emanating from test circuit 513 as previously described; charging circuit 515C works into an ancillary frequency register 514C also comprising a storage capacitor.

The three additional charging circuits 515A, 515B and 515C are also provided with blocking inputs respectively tied to leads 552A, 552B and 595′. Leads 552A and 552B originate at sweep circuit 550 and terminate at respective control inputs of a pair of gates 555A, 555B through which the multiples of selectors 512A and 512B are alternately connectable to corresponding stages of coincidence gate 511. A third digital selector 512C is similarly connectable to coincidence gate 511 through a gate 555C whose control lead 552C emanates from a NOR gate 556 with inputs tied to leads 552A and 552B; conductors 557A and 557B, controlling the gates 554A and 554B, are likewise individually energizable by sweep circuit 550.

The operation of the sweep circuit is controlled by a threshold detector which includes a pair of cascaded flip-flops 558 and 559 along with an integrating network 560. Leads 513*a* and 513*b* are connected to the ungrounded terminal of network 560 by way of respective diodes 561 and 562, diode 561 being in series with an inverter 563. The common terminal of diodes 561 and 562 is tied to the setting input of flip-flop 558 whose resetting input is connected by way of a delay network 564 to the output lead 551' of AND gate 551. The set and reset outputs of flip-flop 558 are coupled to corresponding inputs of flip-flop 559 through the intermediary of respective AND gates 565, 566 whose other inputs are connected in parallel to lead 551'. The reset output lead 559' of flip-flop 559 is connected to an alarm device 567, here shown as a lamp, and also extends to an AND gate 568 in sweep circuit 550 having two other inputs respectively connected to the lead 500*a* and, via a delay network 569, to the output of an OR gate 570 receiving the reset outputs of two flip-flops 571, 572. The setting inputs of these flip-flops are connected, in parallel with corresponding inputs of a further pair of flip-flops 573 and 574, to two conductors 575, 576 which are alternately energized by a Schmitt trigger 577 by way of respective differentiating circuits 575', 575'' and 576', 576''; an inverter 578 is interposed between Schmitt trigger 577 and lead 575.

Flip-flops 571 and 572 are resettable by a pulse $P_1$ on lead 500*a* whereas flip-flops 573 and 574 are connected to be reset by the output of AND gate 568. The set output leads of these latter flip-flops are the conductors 552B and 552A, respectively, while their reset output leads 573', 574' terminate at respective AND gates 585, 586 feeding the leads 557A, 557B as well as the control inputs of a pair of normally closed current gates 581, 582. These gates are serially connected, along with two identical resistors 583 and 584, between terminals 579 and 580 of positive and negative potential, respectively, balanced with reference to ground. The midpoint of the series chain 581–584 is connected through an integrating amplifier 587 to the input of Schmitt trigger 577 which has either a positive or a negative output voltage, being switched from one state to the other as the driving voltage from the bipolar amplifier 587 reaches a predetermined positive or negative value.

Each of AND gates 585 and 586 also has two further inputs, one of them being tied to the corresponding lead 575, 576 (ahead of the associated differentiation circuit) whereas the other is connected to an output lead 588' of a monoflop 588. This monoflop has an input connected to lead 595', with interposition of a circuit breaker 595'', and has a further output lead 588'' terminating at a vertical deflecting electrode of an oscilloscope 589 having a horizontal deflecting electrode tied to the ungrounded terminal of storage condenser 514 by way of a lead 514'. An extension of lead 514' terminates at one input of a comparator 590 whose other input receives the charging potential of the condenser forming part of register 514C. The output of this comparator is returned to the input of register 514C by way of a normally closed gate 591 and a resistor 592 in series therewith; the same output appears at an input 593*b* of a flip-flop 593 whose other input 593*a* receives the comparator output by way of an inverter 594. A further flip-flop 595, whose output lead is the conductor 595', is settable by flip-flop 593 upon any reversal thereof, being connected for this purpose to the two outputs of flip-flop 593 by way of a differentiation network 593'; flip-flop 595 is resettable by a pulse from an OR gate 596 whose inputs are connected to leads 552A and 552B. An AND gate 597A, with one input tied to lead 552A and another input connected to flip-flop input 593*a*, works through an OR gate 598 into a blocking input of gate 591; OR gate 598 also receives the output of a similar AND gate 597B having one input tied to lead 552B and having its other input connected to the flip-flop input 593*b*. Finally, an OR gate 599 has inputs connected to leads 552A and 552B to energize the conductor 552 when either of these leads carries voltage.

The operation of the system of FIG. 5, to the extent that it differs from that of the proceding embodiments, will now be described with reference to FIG. 5A.

Figure 5A:
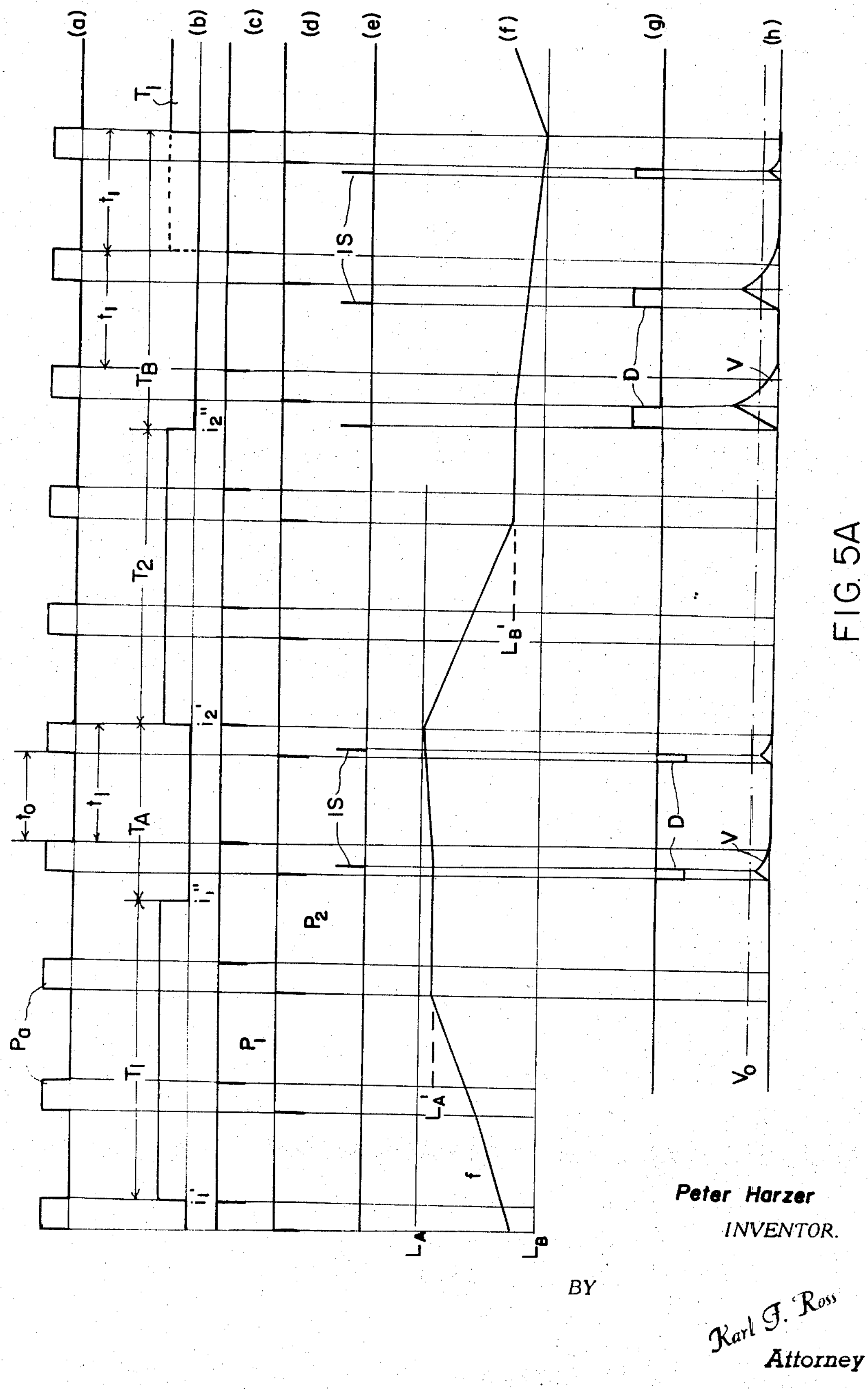
FIG. 5A is a set of graphs relating to the operation of the system of FIG. 5.

Graph (a) of FIG. 5A shows, for convenient comparison with FIG. 1A, the series of rectangular pulses $P_a$ giving rise to the interleaved starting pulses $P_1$ and terminal pulses $P_2$ illustrated in graphs (c) and (d), respectively. Graph (b) illustrates a succession of switchover periods $T_1$, $T_2$ separated by readjustment intervals $T_A$, $T_B$ as established by sweep circuit 550. Period $T_1$ is marked by the open state of current gate 581 for which purpose AND gate 585 must be conductive. This requires a negative output from Schmitt trigger 577 (converted to a positive voltage by inverter 578) and a positive potential on the normally energized output lead 588' of monoflop 588, in addition to the energization of reset output lead 573' of flip-flop 573. Conductor 557A is energized at the same time to unblock the gate 554A whereby the charge stored in register 514A is transmitted, in a nondissipative manner, to integrating amplifier 515' in the input of storage circuit 514 whose capacitor therefore progressively acquires a potential equal or proportional to that stored on the condenser of register 514A. The latter potential determines one of the limits (here assumed to be the upper one) of a frequency range to be swept by the output of oscillator 502. This sweep range has been illustrated in graph (f) of FIG. 5A where the lines $L_A$ and the $L_B$ represent the limits preset in selectors 512A and 512B, respectively.

With both flip-flops 573 and 574 reset at this time, conductors 552B and 552A are de-energized so that gates 555A and 555B are closed, the setting of selectors 512A and 512B having therefore no immediate effect upon the condenser charges stored in registers 514A and 514B. On the other hand, the energization of lead 557A from the output of AND gate 585 unblocks the multiple gate 555C so that the setting of selector 512C is communicated via test circuit 513 to charging circuit 515 and to the three other charging circuits 515A, 515B, 515C in parallel therewith; all these charging circuits are, however, blocked by the absence of operating voltage on leads 552, 552A, 552B and 595'.

Switchover period $T_1$, which starts at an instant $i_1'$ and during which the operating frequency $f$ rises toward its upper limit determined by the charge in register 514A, is long enough to let the storage circuit 314 acquire a corresponding charge by way of amplifier 515'. This switchover period, in the course of which the Schmitt trigger 577 is progressively driven positive by the amplifier 587, terminates with the switching of the trigger circuit at an instant $i_1''$ whereupon positive voltage appears in the output thereof with consequent blocking of AND gate 585 and current gate 581. The appearance of this positive voltage, differentiated in circuit 576', 576'', sets the flip-flops 572 and 574 with resulting de-energization of lead 574' whereby AND gate 586 is prevented from becoming conductive, or is promptly reblocked, to inhibit any significant change in the output voltage of integrating amplifier 587.

The length of switchover periods $T_1$, $T_2$ exceeds several recurrence periods $t_1$ and, in practice, may be chosen as low as 0.1 second or as high as 10 seconds with $t_o = 1$ sec. The immediately following readjustment intervals $T_A$ and $T_B$, however, are much shorter and, normally, barely exceed the length of a recurrence period $t_1$. During the first such interval $T_A$, the arrival of a start pulse $P_1$ over lead **500*a* resets the set flip-flop 572 but cannot reset the flip-flop 574 since, owing to the interposition of delay network 569 between these flip-flops, AND gate 568 is nonconductive at that instant. The next pulse $P_1$, however, finds this AND gate switchable so that flip-flop 574 is also reset and enables the AND gate 586 (it being assumed that monoflop 588 is still in its steady-state condition and that flip-flop 559 has not been set) whereupon current gate 582 opens and allows negative voltage from terminal 580 to reach the input of amplifier 587**. Thus, the instant $i_2'$ ending the readjustment interval $T_A$ coincides with the occurrence of this second pulse $P_1$.

During the interval $T_A$ the charging circuits 515 and 515A are unblocked by the energization of lead 552A so that the potential of the storage condensers in units 514 and 514A is modified in conformity with the reading of selector 512A as transmitted to coincidence gate 511 through the concurrently opened multiple gate 555A. Thus, FIG. 5A shows the frequency $f$ as having reached a level $L_A'$ which is somewhat below the selected upper range limit $L_A$; this deviation may be due to a leakage of the condenser charge or to a prior setting of the selector 512A to a different limit. With the start of the readjustment interval $T_A$, test circuit 513 detects the discrepancy between the actual and the selected oscillator frequency (as described above) and generates the proper corrective voltage so that frequency $f$ is raised to the desired value $L_A$.

Graph (e) of FIG. 5A shows the identity signal IS which, emanating from coincidence gate 511, determines the width and the polarity of the discriminating signal D, graph (g), issuing from test circuit 513. This signal pulse D is fed to integrating circuit 560 where, regardless of its polarity, it generates a rising voltage V, graph (h), which trips the flip-flop 558 upon surpassing a predetermined level $V_o$ determined by the impedances of the flip-flop. In the example illustrated in FIG. 5A, the spacing of pulses $P_2$ and IS is so close that the resulting discriminating pulse D (here negative since pulse IS trails the pulse $P_2$) is too narrow to let the voltage V reach the threshold $V_o$ so that flip-flop 558 is not switched and continues to energize one of the inputs of AND gate 566. The next pulse $P_1$ renders this AND gate conductive to reset the flip-flop 559 if it had been set heretofore; at this stage, therefore, lamp 557 is lit to indicate that the operating voltage of oscillator 502 substantially corresponds to the selected limit. At the same time, the energization of lead 559' supplies operating potential to one of the inputs of AND gate 568 to allow for the resettinf of flip-flop 574 by the following pulse $P_1$ as described above.

At instant $i_2'$, when this resetting occurs, the descending stroke of the frequency sweep begins with the unblocking of AND gate 586 and current gate 582 along with energization of lead 557B to open gate 554B. The removal of voltage from lead 552A again deactivates the charging circuit 515 and 515A so that register 514A retains its recently acquired charge whereas the potential of capacitor 514 is modified under the control of register 514B. During the switchover period $T_2$, whose length is again determined by the time constant of Schmitt trigger 577, the oscillator frequency $f$ reaches a level $L_B$, here assumed to be substantially higher than the desired lower range limit $L_B$ preset in selector 512B. At instant $i_2''$, when the output of Schmitt trigger 577 again goes negative, switchover period $T_2$ terminates with the reclosure of gate 582 and the energization of lead 575 to set the flip-flops 571 and 573; the latter now applies voltage to lead 552B to open the multiple gate 555B and to apply the reading of selector 512B to coincidence gate 511 while also energizing the lead 552 to reactivate the charging circuit 515 and to enable the AND gate 551 for transmission of the next starting pulse $P_1$ to elements 564–566.

Owing to the relatively wide spacing of pulses IS and $P_2$ at this time, with pulse IS leading, the discriminating signal D is now of positive polarity and has a large pulse width sufficient to let voltage V rise above the threshold $V_o$ whereby flip-flop 558 is switched and energizes one of the inputs of AND gate 565. The next pulse $P_1$ passes this AND gate to set the flip-flop 559 with resulting extinction of lamp 567 to indicate a major disparity between the actual and the selected oscillator frequency. At the same time, lead 559' is de-energized but the resulting blocking of AND gate 568 is without immediate effect since the delay network 569 has not yet communicated the reset signal from flip-flop 571 to that AND gate.

In the situation discussed by way of example, the progressive modification of the charge of storage condenser 514 under the control of test circuit 513 and selector 512B is not rapid enough to narrow the next discriminating pulse D to an extent which would prevent the timing voltage V from surpassing the threshold $V_o$ so that upon the occurrence of the next starting pulse $P_1$, when the interval $T_B$ would normally terminate, flip-flop 559 remains set inasmuch as flip-flop 558 has been switched again by the output of integrator 560 after having been restored to normal by the preceding pulse $P_1$ delayed in network 564. Thus, lamp 567 remains unlit and the closure of AND gate 568 prevents a resetting of flip-flop 573 for at least one further full recurrence period $t_1$. At the end of this further period $t_1$, the spacing of pulses IS and $P_2$ is assumed to have decreased sufficiently to permit a termination of the readjustment interval $T_B$ whose extension beyond its normal duration has been indicated in dotted lines in graph (b) of FIG. 5A. The sweep cycle is then resumed with another frequency rise under the control of limit register 514A, as described above.

It will be noted that the disclosed construction of sweep circuit 550 insures the termination of any readjustment interval $T_A$ or $T_B$ precisely at the end of a recurrence period $t_1$ of timer 500, whether this interval has its normal length or has been extended by one or more such periods.

In the preceding discussion of the operation of the system of FIG. 5, no attention has been paid to the detector circuit 514C, 515C etc., intervening in the establishment of a frequency marker at a point preset in the associated selector 512C. With lead 555C energized via NOR gate 556 whenever neither gate 555A nor gate 555B conducts, i.e., throughout a switchover period $T_1$ or $T_2$, the reading of selector 512C is available to counter 511 throughout the upward and downward sweeps so that the output of test circuit 513 during these periods provides a continuous measure of the difference between the actual oscillator frequency and the particular frequency registered in the selector.

As all charging circuits 515, 515A, 515B and 515C are normally blocked during these switchover periods, the operation of test circuit 513 is ineffectual until the condenser potential stored in register 514C matches that appearing on lead 514', as determined by the comparator 590. When the comparator detects such a match, the sign of its output voltage changes so that flip-flop 593 is switched and sets the flip-flop 595 with resulting energization of lead 595'. If circuit breaker 595'' is closed at this time, monoflop 588 is shifted to its unstable state so as to de-energize its output lead 588' with resulting blocking of AND gates 585 and 586 so that the momentarily open current gate 581 or 582 is also closed for the length of an evaluation period represented by the relaxation time of the monoflop. This freezes the input voltage of Schmitt trigger 577 and also removes the operating voltage from conductor 557A or 557B to close the gate 554A or 554B, whichever had been conducting, for a like period. Output lead 588'' of monoflop 588 generates a blip on the screen of oscilloscope 589 at a location corresponding to the momentary operating frequency of oscillator 502 as communicated to the oscilloscope by the output voltage of circuit 514 on lead 514'.

During the same evaluation period, charging circuit 515C is enabled by the energization of conductor 595' to modify the potential stored in register 514C, in the event that the charge on its condenser does not correspond to the setting of selector 512C, in response to a discriminating signal D from test circuit 513 which gradually diminishes as the oscillator frequency approaches the desired value. If this new value lies in the direction of the sweep, i.e., if it is higher than the previous value on the ascending flank or lower on the descending flank, comparator 590 will again respond a short time after the sweep is resumed upon the return of monoflop 588 to normal, thus rearresting the sweep and, if necessary, continuing the modification of the condenser charge in register 514C; this process may be repeated several times during a switchover period. If the modification of the charge had been in the opposite sense, the same iterative adjustment may occur on the subsequent reverse stroke of the sweep.

The generation of such frequency markers may be suspended simply by opening the circuit breaker 595''.

If contractor 590 does not respond during a switchover period because the charge stored in register 514C does not represent a frequency within the current sweep range, gate 591 will be opened during the following readjustment interval by an output pulse from AND gate 597A or 597B traversing the OR gate 588. It is assumed that the polarity of the output voltage of comparator 590 is negative for frequencies below the parity level and is positive for frequencies above that level so that input 593a of flip-flop 593 is energized if no match is detected on an upstroke, thereby unblocking the AND gate 597A for the passage of the subsequent pulse on lead 552A, whereas input 593b carries voltage in the absence of a match on a downstroke to open the AND gate 597B for the passage of the subsequent pulse on lead 552B. In either case, therefore, gate 591 lets the comparator output reach the condenser 514C to modify its charge until it equals that of condenser 514 (at which point the comparator output stops), thus bringing it within range so that the generation of a frequency marker may take place in the above-described manner during the same or the immediate following sweep.

Figure 6:
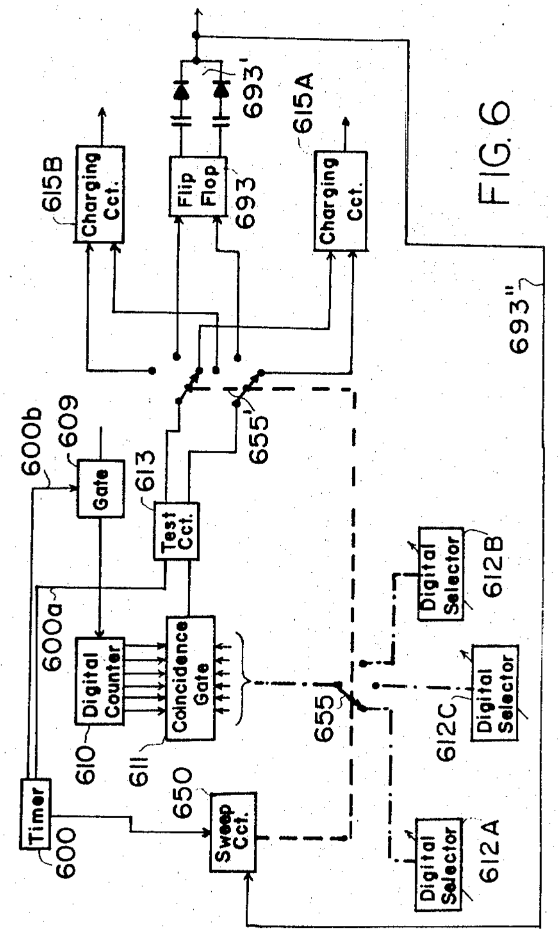
FIG. 6 is a block diagram showing part of a modified system generally similar to that of FIG. 5.

In FIG. 6, finally, I show a simplified arrangement for the generation of frequency markers, elements corresponding to those shown in preceding Figures having been identified by analogous reference numerals with a "6" in the position of the hundreds digit. The several multiple gates 555A, 555B, 555C of FIG. 5 have been indicated diagrammatically as a switch 655 ganged with a switch 655' which controls the charging circuits 615A and 615B. In the intermediate position of switch 655, which corresponds to periods $T_1$ and $T_2$ of FIG. 5A and which operatively connects the selector 612C to coincidence gate 611, switch 655' applies the discriminating signal of test circuit 613 to a flip-flop 693 with a differentiation circuit 693' in its output to generate a pulse on a lead 693'' whenever the flip-flop changes its state as a result of a polarity reversal in the output of that test circuit. Conductor 693'' terminates at the sweep circuit 650 to arrest the sweep for a short period, as by energizing a monostable element similar to monoflop 588 of FIG. 5, thereby generating a frequency marker on an oscilloscope or other indicating device not shown.

The circuit arrangement of FIG. 6 is particularly suitable for systems wherein the switchover periods $T_1$ and $T_2$ are substantially larger than the recurrence period $t_1$, e.g., about 100 times as large, so that the stepped output of test circuit 613 (which jumps at the end of each base period $t_o$) appears more nearly as a continuously varying voltage.

I claim:

1. A variable-frequency generator comprising:
an adjustable oscillator;
a frequency counter with an input receiving the output of said oscillator;
a presettable digital frequency selector;
timer means for establishing a recurrent base period substantially of predetermined duration;
a coincidence circuit connected to receive from said selector a numerical value representing a preset frequency and to receive from said counter a progressively varying signal representing the number of operating cycles of said oscillator counted during a measuring interval starting with the moment of inception of said base period, said coincidence circuit emitting an identity signal upon said progressively varying signal reaching said numerical value;

test means connected to receive from said timer means a terminal pulse at the end of said base period and to receive said identity signal from said coincidence circuit, said test means generating an electrical control variable of a sign depending upon the relative order of occurrence of said terminal pulse and said identity signal;

feedback means for applying said control variable to said oscillator to vary the operating frequency thereof in a sense tending to make said identity signal coincide with said terminal pulse;

monitoring means connected to said timer means and to the input of said counter for detecting any time lag between said moment of inception and the beginning of the first full cycle of said oscillator occurring during said measuring interval; and delay means coupled to said timer means and controlled by said monitoring means for retarding the effectiveness of said terminal pulse by a length of time equaling said time lag.

2. A frequency generator as defined in claim 1 wherein said monitoring means includes integrating means for generating a corrective voltage proportional to the duration of said time lag.

3. A frequency generator as defined in claim 2 wherein said timer means comprises a chain of binary frequency dividers, said delay means being inserted between successive dividers of said chain for retarding the transmission of a stepping pulse therebetween by a length of time proportional to said corrective voltage.

4. A frequency generator as defined in claim 2 wherein said delay means is interposed between said timer means and said test means for retarding the transmission of said terminal pulse to the latter by a length of time proportional to said corrective voltage.

5. A frequency generator as defined in claim 4 wherein said delay means includes a monostable element having a relaxation period variable by said corrective voltage.

6. A frequency generator as defined in claim 5 wherein said delay means further includes an OR gate with a first input connected to the output of said monostable element and with a second input connected to said timer means via a path shunting said monostable element.

7. A frequency generator as defined in claim 1 wherein said counter is provided with an ancillary binary input stage reversible by a first counting pulse from said oscillator and connected to trigger said monitoring means upon such reversal.

8. A frequency generator as defined in claim 1, further comprising ancillary selector means and frequency-modifying means coupled thereto and to said timer means for additionally changing said operating frequency by varying the effective length of said base period.

9. A frequency generator as defined in claim 8 wherein said frequency-modifying means comprises a retarding network for said terminal pulse interposed between said timer means and said test means, said ancillary selector means including a source of control voltage for said network and weighting means responsive to the setting of said digital frequency selector for making the delay time of said network a function of said control voltage varying inversely with said operating frequency.

10. A frequency generator as defined in claim 9 wherein said retarding network comprises a monostable element having a relaxation period variable by said control voltage.

11. A frequency generator as defined in claim 9 wherein the delay time of said network is variable within a predetermined range, said frequency-modifying means further including presetting means coupled with said counter for registering therein a negative preliminary count which corresponds to a frequency rise substantially compensating the frequency drop introduced by said network at the midpoint of said range.

12. A frequency generator as defined in claim 11 wherein said network comprises a time-constant circuit, said presetting means being coupled to an impedance of said circuit for modifying said delay time in conformity with said negative count.

13. A frequency generator as defined in claim 11 wherein said source of control voltage comprises a generator of sawtooth voltages.

14. A frequency generator as defined in claim 9 wherein the delay time of said network is variable between zero and a maximum time corresponding to a frequency drop substantially equaling the minimum frequency increment obtainable by a unit step of said digital selector.

15. A frequency generator as defined in claim 14 wherein said source of control voltage is calibrated in discrete steps corresponding to decimal fractions of said minimum frequency increment.

16. A variable-frequency generator comprising:

an adjustable oscillator;

a frequency-determining circuit for said oscillator including storage means for an electrical control variable, the operating frequency of the oscillator being a function of the magnitude of said control variable;

a first and a second source of charging current for said storage means determining a lower limit and an upper limit, respectively, for said operating frequency;

switch means for alternately connecting said first and second sources to said frequency-determining circuit during successive switchover periods sufficient to allow modification of said control variable in said storage means to establish said lower and upper limits, respectively, for said operating frequency;

selector means settable to a desired frequency between said upper and lower limits and including a third source of charging current;

register means chargeable by said third source for storing an electrical variable corresponding to said desired frequency;

comparison means connected to said storage and register means for ascertaining a match between the electrical variables stored therein; and indicator means connected to said comparison means for emitting an identity signal upon ascertainment of such match.

17. A frequency generator as defined in claim 16, further comprising timer means for controlling said switch means to disconnect said frequency-determining circuit from said first and second sources for a limited readjustment interval at the end of each switchover period, each of said sources including an individual frequency selector and test means effective during said readjustment interval for feeding to said frequency-determining circuit a corrective voltage to modify the stored control variable in a sense compensating for any disparity between said operating frequency and the setting of the respective individual frequency selector.

18. A frequency generator as defined in claim 17 wherein said test means includes a threshold device for comparing the magnitude of said disparity with a predetermined level, said timer means being responsive to said threshold device for extending the duration of said readjustment interval upon said disparity surpassing said level.

19. A frequency generator as defined in claim 16 wherein said indicator means is connected to said switch means for temporarily disconnecting said frequency-determining circuit from said first and second sources in response to said identity signal, thereby holding said operating frequency constant for a limited evaluation period.

20. A frequency generator as defined in claim 19, further comprising additional switch means controlled by said indicator means for connecting said third source to said register means only during said evaluation period to reduce any divergence between the setting of said selector means and the magnitude of the electrical variable stored in said register means.

21. A frequency generator as defined in claim 20, further comprising detector means connected to said indicator means and other switch means controlled by said detector means in the absence of said identity signal during any switchover period for briefly establishing an equalizing circuit between said register means and said storage means at the end of such switchover period for letting said register means acquire the charge of said storage means.

22. A variable-frequency generator comprising:

an adjustable oscillator;

a frequency-determining circuit for said oscillator including storage means for a control variable, the operating frequency of the oscillator being a function of the magnitude of said control variable;

first and second frequency selectors settable to a desired lower and upper limit, respectively, of a sweep range for said operating frequency;

first and second register means for charges adapted to modify the magnitude of said control variable;

first and second charging means for said first and second register means, respectively;

switch means for alternately connecting said first and second register means to said frequency-determining circuit during successive switchover periods sufficient to allow modification of said control variable by the charges thereof;

timer means for controlling said switch means to disconnect said frequency-determining circuit from both said register means for a limited readjustment interval at the end of each switchover period and for alternately connecting said first and second register means to the associated charging means during successive readjustment intervals; and control means effective during each readjustment interval for comparing the operating frequency of said oscillator with the setting of the corresponding frequency selector and for enabling the associated charging means to reduce any disparity therebetween.

23. A frequency generator as defined in claim 22, further comprising additional charging means coupled directly to said storage means and enabled concurrently with said first and second charging means by said test means to modify said control variable.

24. A frequency generator as defined in claim 22 wherein said control means includes a threshold device for comparing the magnitude of said disparity with a predetermined level and for generating an alarm signal upon said disparity surpassing said level.

25. A frequency generator as defined in claim 24 wherein said timer means is connected to respond to said threshold device for extending the duration of said readjustment interval in response to said alarm signal.

26. A frequency generator as defined in claim 25 wherein said timer means includes a generator of periodic reference pulses establishing a succession of recurrent periods for said control means, said timer means further comprising a sweep circuit establishing said switchover periods, said sweep circuit being jointly controlled by said reference pulses and said alarm signal for invariably terminating said readjustment intervals at the end of respective recurrence periods.

27. A frequency generator as defined in claim 22, further comprising a third frequency selector settable to a value between said lower and upper limits, said switch means operatively connecting said third frequency selector to said control means during said switchover periods for generating a marker pulse upon the operating frequency of said oscillator matching the setting of said third frequency selector.

28. A frequency generator as defined in claim 27 wherein said timer means comprises an emitter of periodic reference pulses defining recurrent base periods and wherein said control means includes a counter for the number of oscillator cycles periodically restarted by said reference pulses, coincidence means for generating an identity signal upon the count of said cycles matching the setting of said third frequency selector, test means responsive to said reference pulses and said identity signal for producing a discriminating signal during any switchover period with a polarity determined by the relative order of occurrence of said identity signal and of a reference pulse terminating a base period, and sensing means responsive to a change in the polarity of said discriminating signal for generating said marker pulse.

* * * * *